UNITED STATES PATENT OFFICE.

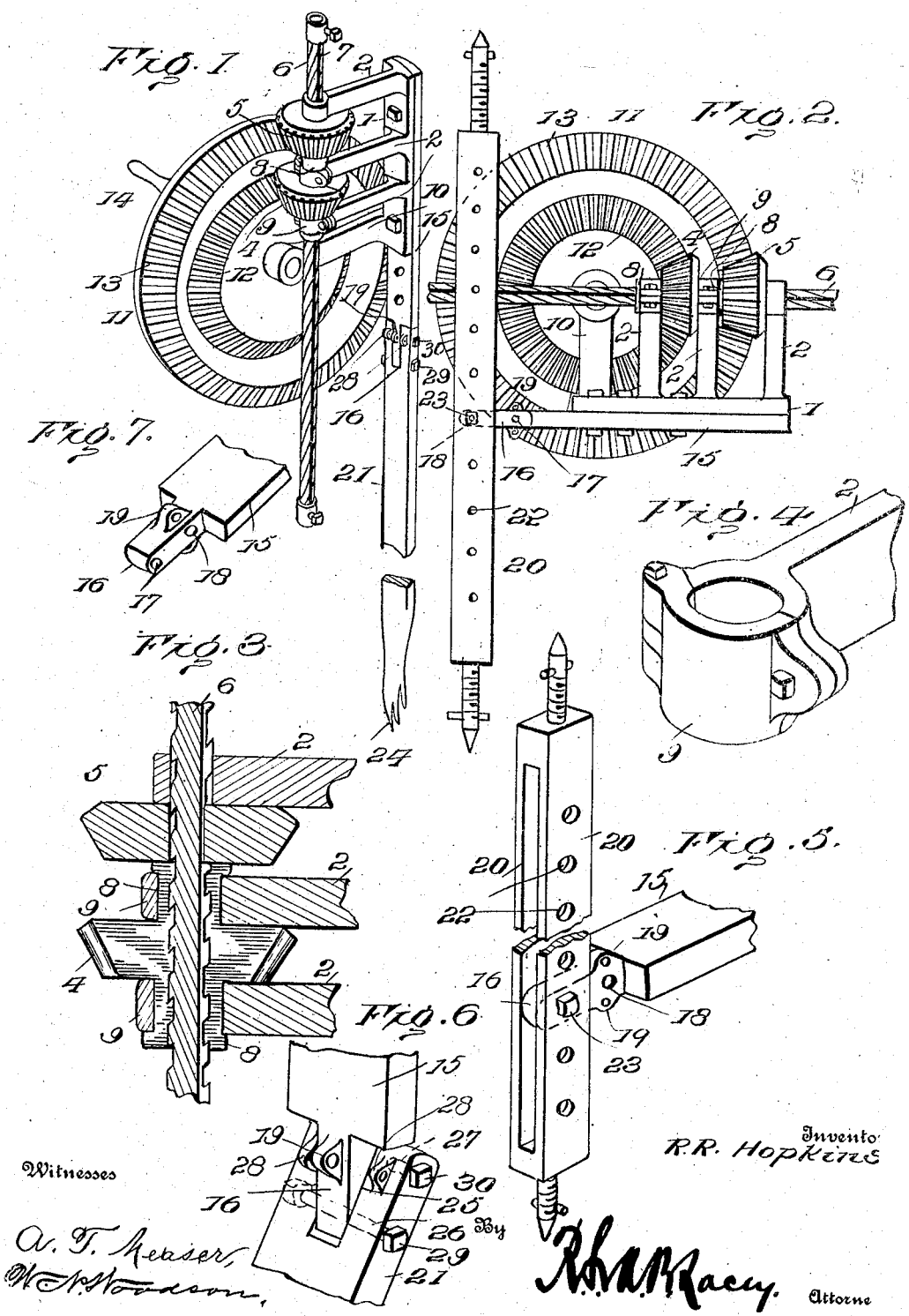

RICHARD R. HOPKINS, OF OSKALOOSA, IOWA.

DRILL.

No. 901,005.

Specification of Letters Patent.

Patented Oct. 13, 1908.

Application filed September 25, 1907. Serial No. 394,531.

*To all whom it may concern:*

Be it known that I, RICHARD R. HOPKINS, citizen of the United States, residing at Oskaloosa, in county of Mahaska and State of Iowa, have invented certain new and useful Improvements in Drills, of which the following is a specification.

The present invention relates to certain new and useful improvements in miners' drills, and more particularly to a novel mechanism for rotating and feeding the drill shaft, and a novel means for adjustably supporting the drill mechanism.

The object of the invention is to design a miner's drill which is of simple and durable construction and can be readily operated by a single man.

For a full description of the invention and the merits thereof and also to acquire a knowledge of the details of construction and the means for effecting the result, reference is to be had to the following description and accompanying drawings, in which:

Figure 1 is a perspective view showing the drill mechanism as mounted upon a supporting bar. Fig. 2 is a side elevation showing the drill mechanism as mounted upon a post. Fig. 3 is an enlarged sectional view through the gear wheels for feeding and rotating the drill shaft. Fig. 4 is an enlarged detail view of one of the bearings. Fig. 5 is a perspective view showing the manner of attaching the bar carrying the drill frame to the post. Fig. 6 is an enlarged detail view of the connection between the supporting bar and the drill frame. Fig. 7 is a detail view of the tongue at the end of the bar to which the frame is attached.

Corresponding and like parts are referred to in the following description and indicated in all the views of the drawings by the same reference characters.

The drill mechanism proper is mounted upon a frame comprising a bar 1 having a plurality of arms 2 projecting laterally therefrom. In the present instance three of the arms 2 are provided and gear wheels 4 and 5 are journaled between the same, the said gear wheels receiving the drill shaft 6. This drill shaft 6 slides freely through the gear wheel 5 but rotates therewith since it is provided with a longitudinal groove 7 receiving a projection upon the said gear wheel. The opposite gear wheel 4 is interiorly threaded and coöperates with the threaded exterior of the drill shaft to feed the latter. In the preferred form of the invention this gear wheel 4 is formed in two sections which are applied to the drill shaft 6 from opposite sides thereof, the said sections of the wheel being normally held together by collars 8 at the ends thereof which are engaged by hinged portions 9 of the bearings upon the arms 2. A bracket 10 also projects from the bar 1 and is formed with a bearing upon which the drive wheel 11 is journaled, the said drive wheel being provided with two concentric rows of teeth 12 and 13 engaging respectively the gear wheels 4 and 5. It will thus be apparent that as the drive wheel is rotated the gear wheels 4 and 5 will revolve upon their bearings, the former serving to feed the drive shaft while the latter causes the same to rotate. Owing to the fact that the rows 12 and 13 of teeth upon the drive wheel are in concentric circles, the row 13 being spaced further from the axis than the row 12, the gear wheel 4 will turn at a lower speed than the gear wheel 5 and this difference in the number of rotations of the said gear wheels in a given time will operate to feed the drill shaft in the required manner. For the purpose of operating the drive wheel 11 a handle 14 of the conventional construction is shown as applied thereto.

A bar 15 is bolted or otherwise detachably secured to the frame upon which the drill mechanism is mounted and projects beyond one end of the same, the projecting end of the said bar terminating in a tongue 16 having a transverse opening 17 near the extremity thereof and also provided toward its base with a similar opening 18. It will also be observed that perforated lugs 19 project from opposite sides of the tongue at the base thereof. This bar 15 may be secured either to a post 20 or to a supporting rod 21 according to the conditions under which the drill is being operated.

The post 20 is of the conventional construction and comprises spaced sides provided with corresponding perforations 22, means being provided at the opposite ends of the post for engaging the top and bottom of a drift. In applying the bar 15 to the post 20 the tongue 16 is inserted between the spaced sides thereof and a bolt or pin 23 passed through one of the openings in the tongue and a selected pair of the perforations 22 in the sides of the post. The drill shaft 6 then operates at right angles to the post and it will be readily apparent that the frame can be vertically adjusted upon the post by causing the pin 23 to engage in a selected pair of perforations 22 therein.

The supporting rod 21 is employed for holding the drill frame in an operative position when the drill shaft is arranged approximately in alinement with the support. One end of this supporting rod 21 is provided with the teeth 24 for engaging the coal or rock while the opposite end is bifurcated at 25 to receive the tongue 16 of the bar 18. The two arms of the bifurcation 25 are provided at their base with the openings 26 corresponding to the opening 17 of the tongue 16, and at their ends with the openings 27 corresponding to the openings 18 of the tongue. It will also be observed that the arms of the bifurcation are provided upon their opposite sides with the perforated lugs 28 corresponding to the lugs 19 of the tongue 16. In securing the tongue 16 within the bifurcation a pin 29 is inserted through the corresponding openings 26 and 17 and a second pin 30 is inserted through any selected openings at the outer end of the bifurcation and the base of the tongue or the ears projecting from said members according to the inclination at which it is desired to hold the drill shaft. In either instance it will be readily apparent that after being properly supported either through the medium of the post 20 or the supporting rod 21 the drill shaft can be rotated and fed forwardly by turning the drive wheel 11.

Having thus described the invention, what is claimed as new is:

1. In a drill, the combination of a frame provided with bearings formed with hinged portions, a drill shaft, a pair of gear wheels journaled upon the frame and engaging the drill shaft to rotate and feed the same respectively, the latter gear wheel being in sections and formed with collars engaged by the hinged bearings to hold the sections of the gear wheel together, and a drive wheel mounted upon the frame and provided with concentric rows of teeth engaging the gear wheels.

2. In a drill, the combination of a frame provided with bearings formed with hinged portions, a drill shaft, a gear wheel journaled within the bearings and having a threaded engagement with the drill shaft, the said gear wheel being in sections and formed with collars engaged by the hinged portions of the bearings to hold the sections of the gear wheel together, and means for rotating the shaft and gear wheel at a differential speed.

In testimony whereof I affix my signature in presence of two witnesses.

RICHARD R. HOPKINS. [L. .s]

Witnesses:
 LISTON McMILLEN,
 G. B. ROW.